United States Patent
Desai et al.

(10) Patent No.: US 11,926,728 B2
(45) Date of Patent: Mar. 12, 2024

(54) SELF-HEALING POLYMERS

(71) Applicant: Eaton Intelligent Power Limited, Dublin (IE)

(72) Inventors: Jayram Shivajirao Desai, Kolhapur (IN); Shireesh Pankaj, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 376 days.

(21) Appl. No.: 17/175,775

(22) Filed: Feb. 15, 2021

(65) Prior Publication Data
US 2021/0253829 A1    Aug. 19, 2021

Related U.S. Application Data

(60) Provisional application No. 63/002,140, filed on Mar. 30, 2020.

(51) Int. Cl.
| | |
|---|---|
| *C08L 77/12* | (2006.01) |
| *B29C 45/14* | (2006.01) |
| *B29C 64/176* | (2017.01) |
| *B29C 64/40* | (2017.01) |
| *B29C 73/22* | (2006.01) |
| *B33Y 10/00* | (2015.01) |
| *B33Y 70/10* | (2020.01) |
| *B33Y 80/00* | (2015.01) |
| *C08K 9/10* | (2006.01) |
| *C08L 101/12* | (2006.01) |

(52) U.S. Cl.
CPC .......... *C08K 9/10* (2013.01); *B29C 45/14008* (2013.01); *B29C 64/176* (2017.08); *B29C 64/40* (2017.08); *B29C 73/22* (2013.01); *B33Y 10/00* (2014.12); *B33Y 70/10* (2020.01); *B33Y 80/00* (2014.12); *C08L 101/12* (2013.01); *C08L 2201/00* (2013.01)

(58) Field of Classification Search
CPC .......... C08K 9/10; B33Y 70/10; B33Y 80/00; C08L 2201/00; C08L 55/02; C08L 1/02; C08L 1/12; C08L 23/02; C08L 23/0853; C08L 23/0861; C08L 25/06; C08L 27/06; C08L 27/18; C08L 33/04; C08L 33/12; C08L 33/20; C08L 59/00; C08L 61/16; C08L 67/02; C08L 69/00; C08L 71/00; C08L 76/04; C08L 77/06; C08L 79/08; C08L 81/06; C08L 83/04; C08L 101/00; C08L 23/06; C08L 23/12; C08L 23/16; C08L 23/18; C08L 25/08; C08L 25/16; C08L 31/04; C08L 33/24; C08L 31/08; C08L 61/04; C08L 67/03; C08L 67/06; C08L 77/04; C08L 77/12; C08L 79/02; C08L 81/04; C08L 81/10; C08J 9/00
USPC .......................................................... 523/210
See application file for complete search history.

(56) References Cited

U.S. PATENT DOCUMENTS

| | | | |
|---|---|---|---|
| 2004/0097005 A1* | 5/2004 | Daniels ................ | H01L 27/148 257/E27.15 |
| 2008/0305343 A1 | 12/2008 | Toohey et al. | |
| 2013/0189888 A1* | 7/2013 | Patrick .................. | B32B 17/04 442/205 |
| 2017/0168037 A1 | 6/2017 | Moore et al. | |
| 2018/0002544 A1* | 1/2018 | Gao ..................... | C09D 175/02 |
| 2018/0280913 A1* | 10/2018 | Kobilka ................. | B01J 13/14 |

OTHER PUBLICATIONS

Cho et al., "Fluid Flow Characteristics of Vascularized Channel Networks", Chemical Science Engineering, vol. 65, 2010, pp. 6270-6281.

* cited by examiner

*Primary Examiner* — Hannah J Pak
(74) *Attorney, Agent, or Firm* — Stinson LLP

(57) ABSTRACT

Described herein are self-healing polymers comprising a base polymer and at least one healing agent disposed in the base polymer under pressure.

13 Claims, 2 Drawing Sheets

SELF-HEALING POLYMERS

CROSS-REFERENCE TO RELATED APPLICATIONS

This application claims priority to U.S. Provisional Patent Application Ser. No. 63/002,140, filed Mar. 30, 2020, and Indian Provisional Application No. 202011006625, filed Feb. 15, 2020 which are hereby incorporated by reference in their entireties.

FIELD

The present disclosure generally relates to self-healing polymers, and more particularly to self-healing polymers for use in hazardous environments.

BACKGROUND

Outdoor electrical products are consistently exposed to extremely harsh environments, such as temperatures ranging from −50° C. to 65° C. and service temperatures in excess of 100° C., with constant exposure to ultraviolet radiation, rain, salt, fog, moisture, humidity, snowfall, ozone, thermal cycling, corrosive chemicals, and the like. In electrical equipment and applications such as lighting, power distribution and control, reliability of a lighting system employed in those applications is vital. Unfortunately, the characteristics (e.g., humidity, extreme temperatures, corrosive gas) of many environments, including but not limited to hazardous environments, can cause the failure of one or more components of a light fixture to be accelerated. Further, the health and safety of a person located in such an environment can be at risk when these structures get damaged.

Thermoplastic polymers must be able to withstand a variety of conditions, especially when utilized in outdoor products and hazardous environments. However, thermoplastic polymers are susceptible to cracking and delaminating which can be difficult to detect and repair with simple means. To address the need for durable products in hazardous environments, components such as heatsinks and enclosures incorporate larger, more complex constructions which often must be discarded once they become damaged, such as from microdamages. However, this results in heavy material waste, large cost to the consumer, and negative effects on the environment.

SUMMARY

In one aspect, a self-healing polymer generally comprises a base polymer and at least one healing agent disposed in the base polymer. A vessel for holding the at least one healing agent is in the base polymer. The healing agent is disposed in the base polymer under pressure.

In another aspect, a method of making a self-healing polymer generally comprises forming a base polymer. 3D printing a sacrificial network. Embedding the sacrificial network in the base polymer. Removing the sacrificial network from the base polymer to form a vascular network in the base polymer for storing a healing agent in the base polymer.

In yet another aspect, a method of making a self-healing polymer generally comprise 3D printing a base polymer and simultaneously 3D printing a vascular network in the base polymer for storing a healing agent in the base polymer.

In still another aspect, a self-healing polymer generally comprises a base polymer and at least one healing agent disposed in the base polymer. Vasculature in the base polymer holds the at least one healing agent in the base polymer. The vasculature is randomly dispersed throughout the base polymer.

In yet still another aspect, an explosion-proof enclosure generally comprises a housing formed from a base polymeric material. At least one healing agent is disposed in the base polymeric material for configuring the polymeric material to be self-healing.

BRIEF DESCRIPTION OF THE DRAWINGS

Various embodiments of the presently disclosed self-healing polymer are described herein with reference to the drawings, wherein.

DETAILED DESCRIPTION

Figure 1:
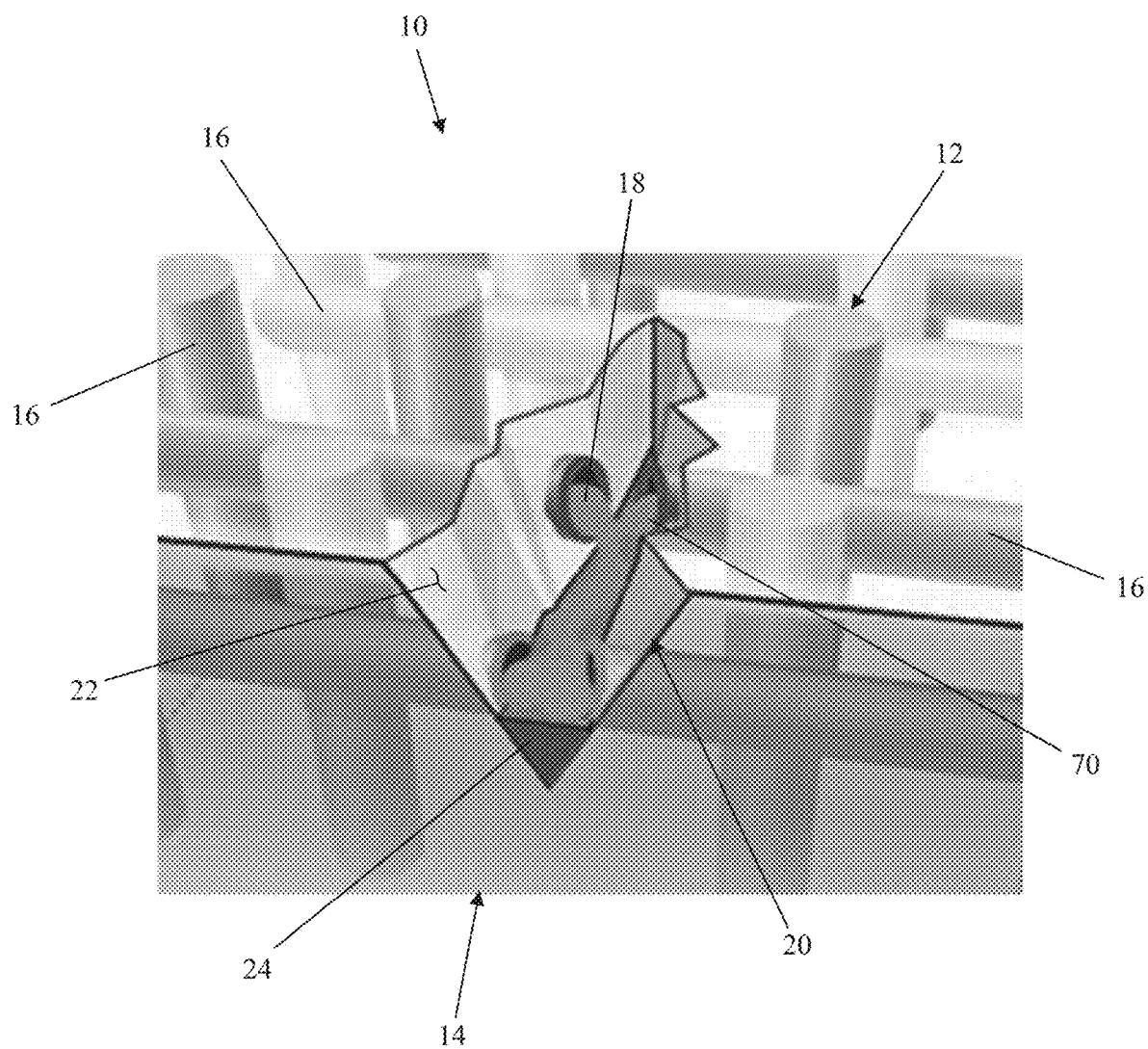
FIG. 1 is an illustration of an embodiment of a self-healing polymer.

In one aspect, the present disclosure is directed to polymeric materials having healing agents (e.g., chemicals) stored therein. These agents can flow onto and/or into cracked surfaces of the polymeric material to heal the cracked surfaces and restore the material integrity of the polymer and thus the overall structure. Using this self-healing technology, the polymeric material can be safeguarded against micro-failures such as cracks, scratches, delamination, fiber de-bonding, and the like which may otherwise require the material to be discarded. The healing process takes place due to the available reversible bonds opening in response to the energy input caused by the damage event allowing for local temporary mobility of the polymer. As a consequence, the polymer is capable of bridging mirror planes at the damage site resulting in a restoration process of the chemical or physical bond strength. Configuring the polymers to have these self-healing characteristics provides the polymers with the ability to transform physical energy (e.g., scratch) into a chemical and/or physical response (e.g., reaction) to heal the damage to the material. Thus, an external stimulus resulting in damage to the polymer causes the polymer to respond and recover the initial material properties.

In order to prolong the working life of components and to address the problems of the high cost of material waste for materials used in hazardous conditions, the present disclosure creates self-healing polymers made by incorporating healing agents (e.g. functional fluids) into a base polymer in order to configure the polymer composition with the ability to repair itself after damage. In this way, the structural integrity of the polymer can be maintained after damage has occurred. Different methods for embedding the healing agents in the polymer may be used. As will be discussed in greater detail below, a capsule based method may be employed whereby the healing agents are held within capsules which are embedded in the polymer. When cracks are formed in the polymer, the capsules rupture and the healing agents are expelled from the capsules and flow into the cracks where they polymerize to heal the crack. Alternatively, a vasculature based method may be used such that a vasculature network (i.e., hollow veins) are formed in the polymer and are filled with the healing agents. Damage to the polymer causes the healing agents to flow from the veins into the damaged area. It will be understood that the self-healing polymeric material may include healing agents stored in vasculature within the polymer, in microcapsules within the polymer, or a combination thereof. Other methods for embedding the self-healing agents (e.g., chemicals) in the polymer are also envisioned. For instance, other extrinsic self-healing methods and/or intrinsic self-healing methods could be utilized.

The thermoplastic polymer compositions of the present disclosure can be used in various articles and methods. For example, the compositions can be injection molded, blow molded, and/or extruded. Suitable applications include lighting fixtures, electric housings, motor housings, enclosures for power distribution and control, power converters (e.g., inverter housings or enclosures), heat sinks, cold plates, heat pipes, module enclosures (e.g., sensors), and camera housings or enclosures. Particularly useful applications include use in light-emitting diode (LED) fixtures, for example, as a heat sink.

In various embodiments, the thermoplastic polymer compositions and/or articles made from the thermoplastic polymer compositions of the present disclosure meet certain standards and/or requirements. For example, NEMA sets standards with which an enclosure must comply in order to qualify as an explosion-proof enclosure. Specifically, NEMA Type 7, Type 8, Type 9, and Type 10 enclosures set standards with which an explosion-proof enclosure within a hazardous location must comply. For example, a NEMA Type 7 standard applies to enclosures constructed for indoor use in certain hazardous locations. Hazardous locations may be defined by one or more of a number of authorities, including but not limited to National Electric Code (NEC) (e.g., Class 1, Division I) and Underwriters' Laboratories, Inc. (UL) (e.g., UL 1203). For example, a Class 1 hazardous area under the National Electric Code is an area in which flammable gases or vapors may be present in the air in sufficient quantities to be explosive. Hazardous location are also set by the International Electrotechnical Commission (IEC). For example, IEC Zone 2 covers explosive gas atmospheres where ignitable concentrations of flammable gases or vapors which are not likely to occur under normal operating conditions and do so only for a short period of time.

Examples of hazardous locations in which example embodiments can be used include, but are not limited to, an airplane hangar, an airplane, a drilling rig (as for oil, gas, or water), a production rig (as for oil or gas), a refinery, a chemical plant, a power plant, a mining operation, a steel mill, and the like.

In one aspect, the present disclosure is directed to a self-healing polymer generally comprising a base polymer comprising a polymer or polymer blend, one or more healing agents, one or more vessels for at least temporarily holding the healing agents in the polymer, and one or more catalysts configured for initiating the healing reaction upon release of the healing agents from the vessels. Additional components can also be incorporated.

The base polymer has a high resistance to chemicals and is able to withstand harsh and hazardous environments. In order to achieve ideal properties, a polymer blend may be preferred. The base polymer can comprise a resin material. The polymer/resin can comprise a thermoplastic material or a thermoset material. In particular, useful polymers include thermoplastic polymers, for example, acrylonitrile butadiene styrene, acrylic, celluloid, cellulose acetate, cyclic olefin copolymer, ethylene-vinyl acetate, ethylene vinyl alcohol, polytetrafluoro ethylene, ionomers, liquid crystal polymer, polyoxymethylene, polyacrylates, polyacrylonitrile, polyamide (e.g., polyamide 66 or polyamide 6), polyamide-imide, polyimide, polyaryletherketone, polybutadiene, polybutylene terephthalate, polycarpolactone, polychlorotrifluoroetyhlene, polyether ether ketone, polyethylene terephthalate, poly-cylcohexylene dimethylene terephthalate, polycarbonate, polyhydroxalkanoates, polyketones, polyester, polyolefin (e.g., polyethylene, polypropylene, polybutylene, and the like) polyetherketoneketone, polyetherimide, polyethersulfone, polysulfone, chlorinated polyethylene, polylactic acid, polymethylmetacrylate, polymethylpentene, polyphenylene, polyphenylene sulfide (PPS), polyphthalamide, polystyrene, polysulfone, polytrimethylene terephthalate, polyurethane, polyvinyl acetate, polyvinyl chloride, polyvinylidene chloride, styrene-acrylonitrile, or mixtures thereof.

The self-healing agent can comprise any suitable agent known in the art. As an example, the self-healing agent can comprise, dicyclopentadiene (DCPD), hydroxyl-functionalized polydimethylsiloxane (HOPDMS) and polydiethyoxysilane (PDES), polydimethylsiloxane (PDMS) or mixtures thereof. Other self-healing agents are also envisioned. The catalyst component can comprise, for example, Grubbs' catalyst (benzylidene-bis(tricyclohexylphosphine) dichlororuthenium, or di-n-dibutyltin dilaurate (DBTL). Other catalyst components are also envisioned.

Vasculature Based Method

Referring to FIG. 1, a self-healing polymer 10 may be formed using vascular-based healing by embedding or otherwise disposing a vascular network 12 within a base polymer 14. For example, sacrificial networks can be embedded in the base polymer 14 during the formation of the base polymer. The sacrificial networks can then be removed from the base polymer, such as by a suitable leaching technique, to leave behind a series of hollow passages 16 defining the vascular network 12. The passages 16 may have a diameter ranging from about 1 m to about 1 mm within the base polymer 14. The hollow passages 16 may be randomly oriented and dispersed throughout the base polymer 14. As such, the hollow passages 16 can be arranged such that they are not positioned in any repeated or symmetrical or discernable pattern. Alternatively, the vascular network 12 may have a predetermined (e.g., repeating) 2D or 3D pattern. In one embodiment, the sacrificial network can be made using 3D printing. In this respect, the sacrificial network can be 3D printed separately from the formation of the base polymer 14 and embedded in the base polymer. Alternatively, the base polymer 14 and sacrificial network can be simultaneously 3D printed. The vascular network may still be formed by other means including, without limitation, laser micromachining, soft lithography, electrostatic discharge, fugitive inks, and hollow glass fibers.

One or more healing agents 18 can then be injected into the hollow passages 16 of the vascular network 12. The healing agents 18 may be introduced into the passages 16 either by pumping or through capillary forces. In one embodiment, the healing agent 18 is injected into and held in the passages 16 of the vascular network 12 under pressure. This can be achieved in a number of ways. For example, a vacuum state can be created by removing air from the vascular network 12 and injecting the healing agent 18 into the vacuumed vascular network. Alternatively, the base polymer 14 can be compressed and/or squeezed so that the internal vascular network 12 becomes compressed whereby the healing agents 18 in the internal vascular network are held under pressure. Still other methods for disposing the healing agent 18 in the vascular network under pressure are envisioned.

The healing agents 18 are released when the vascular network 12 becomes fractured such as by the formation of a scratch or crack 20 in the material. In one embodiment, the low viscosity of the healing agent 18 facilitates infiltration of the healing agent into the damage site. Upon being expelled from the vasculature 14, the healing agent 18 contacts a catalyst component 22 in the polymer 14 which in turn polymerizes the healing agent creating a healing event 24. This reaction causes the mirror plane bridging of the polymer material which repairs the damage to the polymer 14. In one embodiment, the vascular network 12 may be refilled with a healing agent 18 for subsequent healing.

Microcapsule Based Method

Figure 2:
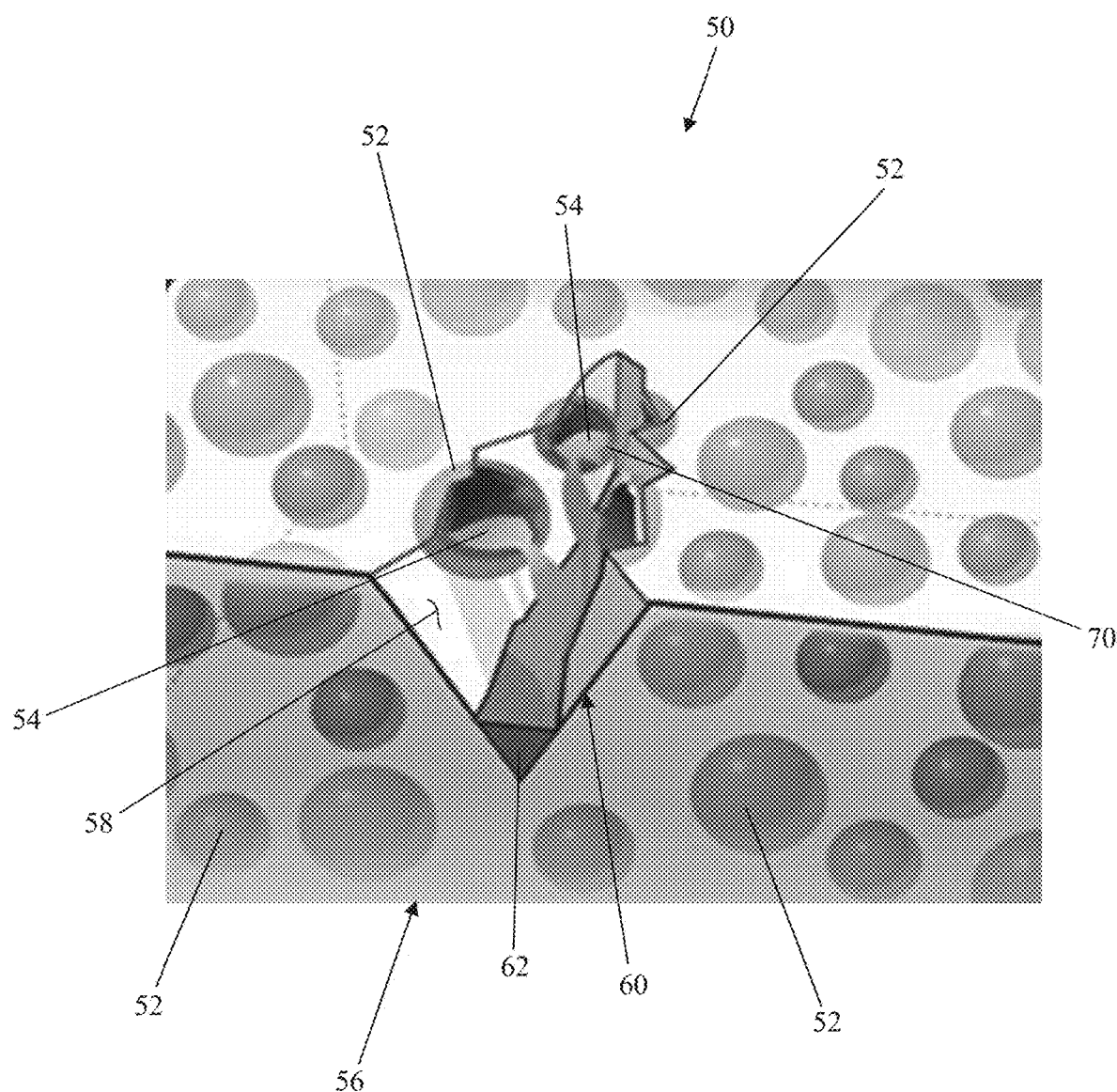
FIG. 2 is an illustration of another embodiment of a self-healing polymer.

Referring to FIG. 2, a self-healing polymer 50 may be formed using an emulsification technique whereby microcapsules 52 which store one or more healing agents 54 are embedded within a base polymer 56. In one embodiment, the microcapsules 52 are formed by meltable dispersion whereby the healing agent 54 is dispersed in a melted polymer. The solidification of the polymer forms the capsules 52 around the healing agent 54. The microcapsules 52 may be incorporated into the base polymer 56 during the formation of the base polymer. A catalyst component 58 that induces polymerization of the healing agent 54 may also be embedded in the base polymer 56. When the polymer composite experiences damage, such as at a crack 60, it can rupture the microcapsules 52. The healing agent 54 can then be drawn out of the microcapsule 52 by capillary action and flow into the damage site (e.g., crack 60) where it is polymerized by the catalyst component 58. The polymerized material 62 then repairs the damaged area.

In one embodiment, the average diameter of the microcapsules 52 ranges from about 300 to about 700 m. The microcapsules 52 can be made from any suitable material such as poly(urea-formaldehyde) (PUF). Further, the healing agent 54 and catalyst component 58 can be incorporated into the base polymer 56 in a variety of ways. For instance, the encapsulated healing agent 54 can be combined with a catalyst component 58 dispersed throughout the base polymer. Alternatively, the healing agent 54 and the catalyst component 58 can be held in different capsules 52 within the base polymer 56. Still other arrangements of the healing agent 54 and catalyst component 58 are envisioned.

The vasculature 12 or microcapsules 52 can also contain a fluorescent material 70 which upon breakage of the vasculature or microcapsules flows over the cracked surfaces making the cracks 20, 60 more visible thereby providing an alert of the damage to the user. In one embodiment, the fluorescent material 70 is disposed near an exterior surface of the polymer material 14, 56. For example, the florescent material/fluid 70 can be stored in the vasculature 12 or microcapsules 52 near the outer surface of the component allowing the material/fluid to flow onto the surface after damage occurs to the surface. Therefore, the self-healing polymer technology converts the polymeric structure into an intelligent structure which can address and respond to the micro-failure on its own while also providing an indication of the micro-failure to the user.

Having described the disclosure in detail, it will be apparent that modifications and variations are possible without departing from the scope of the disclosure defined in the appended claims.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the compositions without departing from the scope of the disclosure, it is intended that all matter contained in the above description shall be interpreted as illustrative and not in a limiting sense.

The invention claimed is:

1. A self-healing polymer comprising:
a base polymer;
at least one healing agent disposed in the base polymer; and
a vessel for holding the at least one healing agent in the base polymer, the healing agent being disposed in the base polymer under pressure, wherein the vessel comprises vasculature embedded in the base polymer and wherein the vasculature is randomly dispersed throughout the base polymer.

2. The self-healing polymer of claim 1, wherein the at least one healing agent is disposed in the vasculature in a vacuum.

3. The self-healing polymer of claim 1, wherein the base polymer is compressed to maintain the at least one healing agent in the base polymer under pressure.

4. The self-healing polymer of claim 1, wherein the base polymer is configured to be explosion-proof.

5. The self-healing polymer of claim 1, further comprising florescent material disposed in the base polymer.

6. The self-healing polymer of claim 5, wherein the florescent material is disposed adjacent an exterior surface of the base polymer.

7. The self-healing polymer of claim 1, further comprising a plurality of vessels each holding a healing agent.

8. The self-healing polymer of claim 7, wherein the plurality of vessels comprise vasculature and microcapsules embedded in the base polymer.

9. The self-healing polymer of claim 1, further comprising a catalyst component disposed in the base polymer for polymerizing the healing agent when the healing agent is expelled from the vessel.

10. An explosion-proof enclosure comprising a housing formed from the self-healing polymer as recited in claim 1.

11. The enclosure of claim 10, wherein the enclosure is one of a NEMA/UL rated enclosure for NEC/CEC governed locations, or an enclosure for IECEx/ATEX governed locations.

12. The self-healing polymer of claim 1, wherein the at least one healing agent is disposed in the base polymer under pressure by either creating a vacuum state by removing air from the vasculature and injecting the healing agent into the vacuumed vasculature, or compressing the base polymer so that the vasculature is compressed whereby the healing agent in the vasculature is held under pressure.

13. An explosion-proof enclosure comprising a housing formed from a self-healing polymer, the self-healing polymer comprising:
a base polymer;
at least one healing agent disposed in the base polymer; and
a vessel for holding the at least one healing agent in the base polymer, the healing agent being disposed in the base polymer under pressure;

wherein the enclosure is one of a NEMA/UL rated enclosure for NEC/CEC governed locations, or an enclosure for IECEx/ATEX governed locations.

\* \* \* \* \*

UNITED STATES PATENT AND TRADEMARK OFFICE
CERTIFICATE OF CORRECTION

| | | |
|---|---|---|
| PATENT NO. | : 11,926,728 B2 | Page 1 of 1 |
| APPLICATION NO. | : 17/175775 | |
| DATED | : March 12, 2024 | |
| INVENTOR(S) | : Shireesh Pankaj | |

It is certified that error appears in the above-identified patent and that said Letters Patent is hereby corrected as shown below:

On the Title Page

Item (30), should read:
--Foreign Application Priority Data
Feb. 15, 2020   (IN) ................................ 202011006625--

Signed and Sealed this
Sixteenth Day of July, 2024

*Katherine Kelly Vidal*

Katherine Kelly Vidal
*Director of the United States Patent and Trademark Office*